(12) United States Patent
Yamaguchi

(10) Patent No.: US 6,881,969 B2
(45) Date of Patent: Apr. 19, 2005

(54) ELECTRON BEAM TREATMENT DEVICE

(75) Inventor: Masanori Yamaguchi, Himeji (JP)

(73) Assignee: Ushiodenki Kabushiki Kaisha, Tokyo (JP)

( * ) Notice: Subject to any disclaimer, the term of this patent is extended or adjusted under 35 U.S.C. 154(b) by 7 days.

(21) Appl. No.: 10/013,536

(22) Filed: Dec. 13, 2001

(65) Prior Publication Data

US 2002/0074519 A1 Jun. 20, 2002

(30) Foreign Application Priority Data

Dec. 14, 2000 (JP) ........................................ 2000-379679

(51) Int. Cl.[7] .............................................. G21G 5/00
(52) U.S. Cl. ................................................ 250/492.3
(58) Field of Search ..................................... 250/492.3

(56) References Cited

U.S. PATENT DOCUMENTS

| | | | | |
|---|---|---|---|---|
| 3,925,670 A | * | 12/1975 | Farrell et al. ............... | 250/400 |
| 5,414,267 A | * | 5/1995 | Wakalopulos ............ | 250/492.3 |
| RE35,203 E | | 4/1996 | Wakalopulos | |
| 5,909,032 A | * | 6/1999 | Wakalapulos ............ | 250/492.3 |
| 6,001,898 A | * | 12/1999 | Lutz ........................... | 523/160 |
| 6,140,657 A | * | 10/2000 | Wakalapulos et al. ... | 250/492.3 |
| 6,246,824 B1 | * | 6/2001 | Vandeberg et al. ......... | 385/129 |

FOREIGN PATENT DOCUMENTS

EP  1 104 002 A1  5/2001

* cited by examiner

Primary Examiner—John R. Lee
Assistant Examiner—Phillip Johnston
(74) Attorney, Agent, or Firm—Nixon Peabody LLP; David S. Safran

(57) ABSTRACT

An electron beam treatment device is provided for treating a substance located in a processing chamber which includes electron beam tubes arranged such that electron beam windows project into the processing chamber. The electron beam tubes are arranged such that an absorption dose of the entire treatment area of the substance to be treated has a given distribution. The electron beams emitted by the electron beam tubes are advantageously superimposed so that the absorption dose of the entire treatment area of the substance to be treated in shifted into a given distribution condition, and in which thus the entire treatment area of the substance to be treated can be treated as a whole without moving the substance to be treated.

8 Claims, 3 Drawing Sheets

ELECTRON BEAM TREATMENT DEVICE

BACKGROUND OF THE INVENTION

1. Field of the Invention

The present invention relates to an electron beam treatment device which is used for processes such as surface activating, thin layer formation, electron beam curing, dry cleaning and the other similar processes.

2. Description of Related Art

With respect to electron beam irradiation technology, it is possible to have electrons penetrate rather deeply into the substance to be treated by using high electron energy. Thin layer curing techniques using this feature are known.

For example, in Japanese patent disclosure document HEI 8-510864, electron beam tubes are arranged in a straight line or zigzag, and the electron beams emitted by several electron beam tubes are superimposed such that they are all in a straight line. The substance to be treated is treated by these straight electron beams. In one such device the electron beams are all in a straight line. To treat the entire treatment surface of the substance to be treated, it is therefore necessary to move the substance to be treated with respect to the electron beam tubes. In Japanese patent disclosure document HEI 8-510864, the substance to be treated is moved using a roller which is the transport system.

Since the transport system is located directly underneath the electron beam tubes, it is extremely difficult to control the irradiation atmosphere of the electron beams. Normally, the substance to be treated is irradiated with electron beams in the air (atmosphere). Recently, the SOG film curing technique has been undergoing more and more advanced development. A film formed by this technique is being used more and more often as an insulating film layer of a semiconductor or the like. Conventionally, in a process for producing a SOG film by a spin coater, a liquid material for a layer is applied to a silicon wafer and becomes a film after heating for roughly one hour at 400° C. to 450° C.

Using heating alone, curing lasts roughly one hour and, therefore, it was desirable to shorten the curing time to increase the throughput. It was discovered that the film is cured in a short time and that the desired layer can be obtained when a liquid material for a film on a silicon wafer, or a liquid material preheated to roughly 200° C. for a film, is irradiated with high energy electron beams and the liquid material for the film cures from the inside.

In the device in which there are several electron beam tubes in a straight line or a zigzag, the electron beams all become straight without broadening, as was described above. Therefore the silicon wafer, to which the liquid material for the film has been applied, must be moved with respect to the electron beam tubes. When contamination particles form upon movement out of the transport system, the liquid material for the film is contaminated. This disadvantageously results in faults forming in the SOG film.

The following has also been discovered. When the silicon wafer, to which the liquid material for the film has been applied, is heated simultaneously with electron beam radiation, a clear synergistic effect occurs, by which the film can cure in an extremely short time. However, the device which moves the silicon wafer as it is being heated is extremely complex. Furthermore, contamination particles from the heat source form, resulting in the disadvantage that the degree of faults in the SOG film increases.

SUMMARY OF THE INVENTION

One object of the present invention is to provide an electron beam treatment device which eliminates the disadvantages of the prior art.

Another object of the present invention is to provide an electron beam treatment device in which electron beams emitted by several electron beam tubes are advantageously superimposed so that the absorption dose of the entire treatment area of the substance to be treated is shifted into a given distribution condition, and, therefore, in which the entire treatment area of the substance to be treated can be treated as a whole without moving the substance to be treated.

The above objects and other objects are achieved by providing an electron beam treatment device including several electron beam tubes mounted on a processing chamber and each including a vacuum container and an electron beam generating device. The substance to be treated is mounted in the processing chamber. On a front side of each-tube is an electron beam window for transmission of the electron beams produced by the electron beam generating device. The electron beam tubes are arranged such that the absorption dose of the entire treatment area of the substance to be treated is in a given distribution condition. The device may also include a pressure control system for causing a low pressure in the processing chamber. The device may also include a stage positioned in the processing chamber for accommodating the substance to be treated. The stage may be capable of changing the distance from the electron beam windows to the substance to be treated.

DETAILED DESCRIPTION OF THE INVENTION

Figure 1:
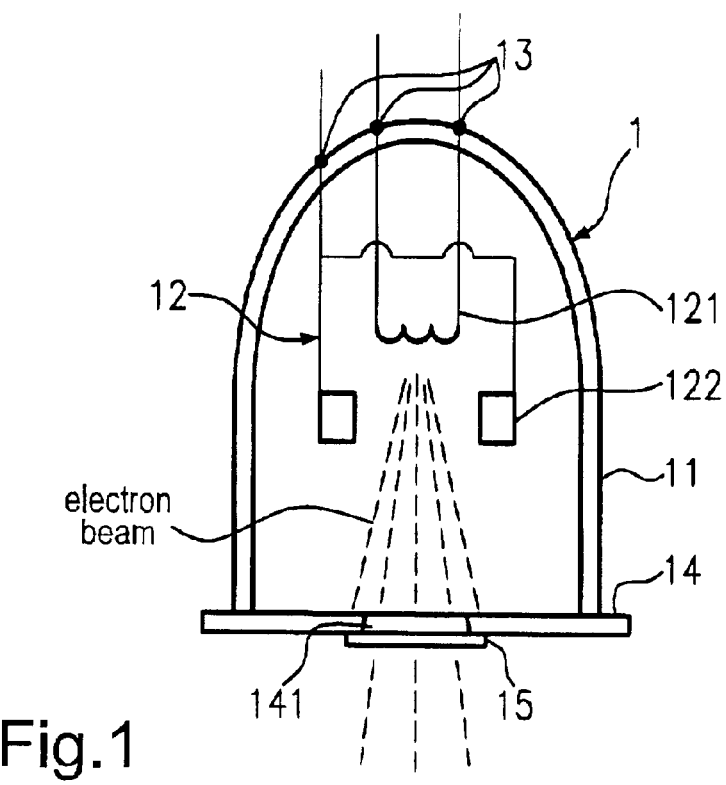
FIG. 1 is a schematic of the electron beam tube of the present invention.

FIG. 1 is a schematic of the electron beam tube used for the electron beam treatment device of the present invention. An electron beam tube 1 includes a vacuum container 11 of glass and an electron beam generating device 12 located in vacuum container 11. The electron beam generating device 12 includes an emission filament 121 and a grating 122. A high voltage of, for example, 5 kV to 70 kV from a DC high voltage power source is applied via terminals 13 to emission filament 121 and grating 122. Current from another heating current source is supplied to emission filament 121 via terminals 13, heating the emission filament and causing thermal ions to be emitted. The emitted electrons are concentrated by the electrical field produced by grating 122.

On one end of vacuum container 11, there is a cover component 14 of silicon which is provided with a slot 141 through which electron beams pass. On a front side of electron beam tube 1, in front of slot 141, a silicon thin layer-like electron beam window 15 is made such that it hermetically covers slot 141. The electron beams produced by the electron beam generating device 12 pass through this electron beam window 15 and are emitted to the outside of electron beam tube 1.

Figure 2:
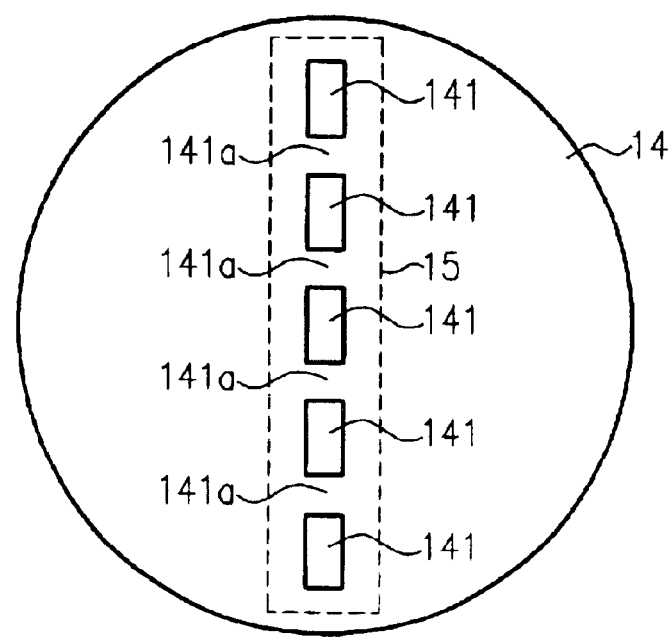
FIG. 2 is a front view of the cover component of the electron beam tube.

FIG. 2 shows a front view of cover component 14 in which there are five slots 141 in a straight line. Between the respective slots 141, a bridge part 141a is formed. Furthermore, electron beam window 15, which is shown as a dashed line, is formed with a rectangular outside diameter, such that all slots 141 are covered.

Electron beam window 15 consists mainly of silicon or a silicon compound and has a thickness from 0.3 microns to 3 microns, so that the electron beams produced by electron beam generating device 12 are advantageously transmitted. Since electron beam window 15 has a very small thickness from 0.3 to 3 microns, as was above described, it is possible for electron beam window 15 to break due to passage of the electron beams or a voltage applied to electron beam window 15 when the area of slot 141 becomes large. To prevent this, the area of the respective slot 141 is made smaller and a bridge part 141a is located between the respective slots 141, as above described. Thus, breaking of the electron beam window 15 is prevented. The reason for the straight arrangement of the slots 141 is to emit the electron beams essentially uniformly onto each slot 141.

Figure 3:
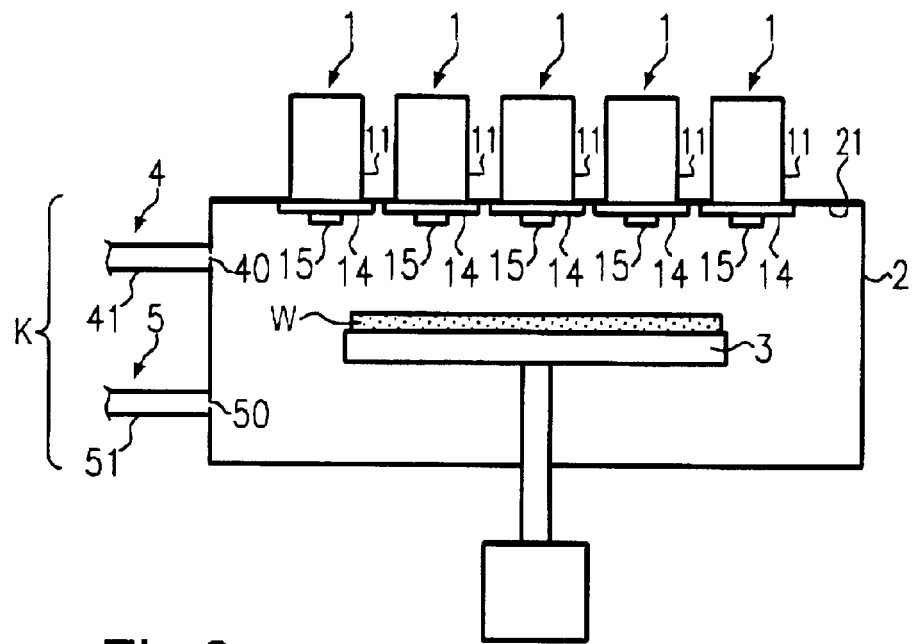
FIG. 3 is a schematic of the electron beam treatment device of the present invention.

Referring to FIG. 3, which shows the electron beam treatment device of the present invention, in the respective electron beam tube 1 on one end of the above described vacuum container 11, the cover component 14 is formed and attached to the upper wall 21 of the processing chamber 2 hermetically enclosing chamber 2. As a result, electron beam window 15 projects into the processing chamber 2.

In the processing chamber 2, there is a stage 3 on which a substance W to be treated is placed. Substance W to be treated is located opposite the electron beam windows 15. The stage 3 can change the distance between the electron beam windows 15 of the electron beam tubes 1 and substance W.

In the processing chamber 2, an outlet system 4 is provided which includes an outlet opening 40 for reducing the pressure inside processing chamber 2 and an outlet tube 41 which is connected to outlet opening 40. The reason for outlet system 4 is that the electron beams transmitted by the electron beam windows pass through the space within the processing chamber 2 and are emitted onto the substance W to be treated. The broadening and the range of the electron beams are fixed by the pressure within the processing chamber 2. To achieve the desired broadening and the desired range of the electron beams, the internal pressure within the processing chamber 2 is controlled via the outlet tube 41.

Furthermore, in the processing chamber 2, a gas inlet system 5 is provided which includes a gas inlet opening 50 and an inlet tube 51 connected to gas inlet opening 50. Gas inlet opening 50 admits gases such as a protective gas, for example nitrogen or the like, and a gas such as argon or the like. The protective gas is used to prevent a reaction in the processing chamber 2 except for the desired reaction of the substance W to be treated. The gas such as argon is used at the same time to induce the desired reaction in the processing chamber 2, such as generating UV radiation or like.

During operation, the inside of processing chamber 2 is shifted into the desired lower pressure state by outlet system 4. Next, nitrogen gas is admitted into processing chamber 2 by gas inlet system 5. The processing chamber 2 is filled with nitrogen gas and thus shifted into the low pressure state. This means that in processing chamber 2 there is a pressure control system K, consisting of outlet system 4 and gas inlet system 5, which establishes the types of gases and the low pressure state within processing chamber 2 and adjusts the broadening and range of the electron beams.

Figure 4:
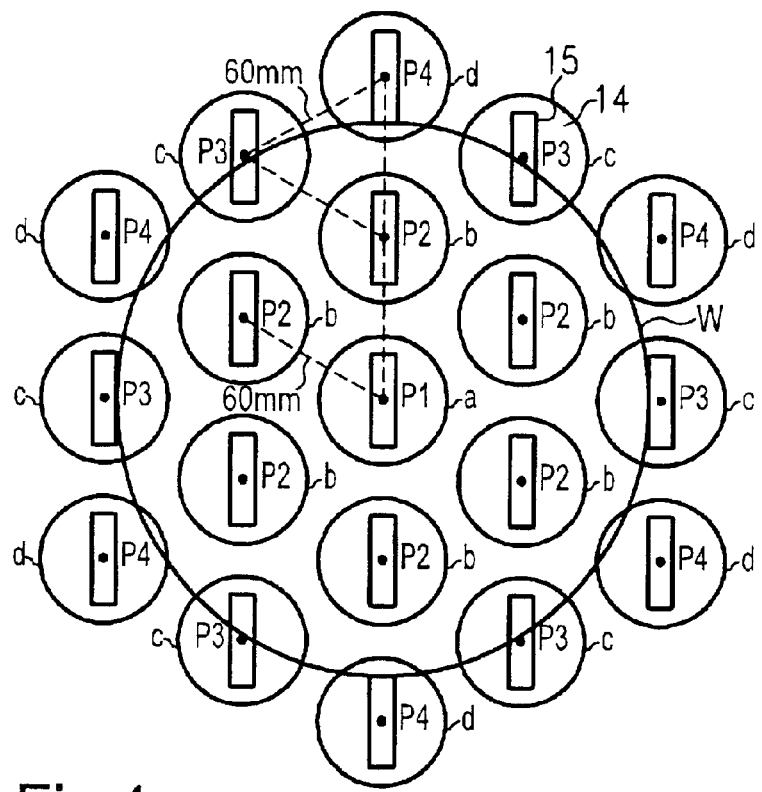
FIG. 4 is a schematic of the arrangement of the electron beam tubes of the electron beam treatment device of the present invention.

FIG. 4 is a schematic of the arrangement of the electron beam tubes of the electron beam treatment device of the present invention in which the arrangement of the respective electron beam tubes is shown from the side of the substance W to be treated (FIG. 3). FIG. 4 illustrates cover component 14, the electron beam window 15 of each electron beam tube 1 and substance W so that the relation between the arrangement of the electron beam tubes and the round substance to be treated can be seen.

In FIG. 4, cover component 14 of the respective electron beam tube 1 is arranged such that center points P2, P3 and P4 of the electron beam windows 15 of other electron beam tubes b,c,d are located on concentric circles around the center point P1 of the electron beam window 15 of a center electron beam tube a with a spacing of 60°, and that all distances between the center points P1, P2, P3 and P4 of adjacent electron beam windows 15 are 60 mm.

Specifically, there are a total of 19 electron beam tubes 1 arranged as follows. Six electron beam tubes b are arranged around the center point P1 of the electron beam window 15 of the center electron beam tube a such that the center points P2 of the electron beam windows 15 are 60 mm away from this center point P1 and such that the center points 2 of the electron beam windows 15 are positioned at points at which a spacing of 60° is maintained around the center point P1. Around the center point P1 of electron beam window 15 of the center electron beam tube a, there are six electron beam tubes c arranged such that center points P3 of the respective electron beam windows 15 are approximately 104 mm away from center point P1, and such that center points P3 of the respective electron beam windows 15 are positioned at points at which a spacing of 60' is maintained around the center point P1. Six electron beam tubes d are arranged around center point P1 of electron beam window 15 of the center electron beam tube a such that center points P4 of the respective electron beam windows 15 are around 120 mm away from center point P1 and such that center points P4 of the respective electron beam windows 15 are positioned at points at which a spacing of 60° is maintained around the center point P1. In this way, the electron beam tubes b, c and d are located concentrically to one another around the electron beam tube a. The output of the electron beam tube a is 45 $\mu$A, the output of the electron beam tube b is 50 $\mu$A, the output of the electron beam tube c is 60 $\mu$A, and the output of the electron beam tube d is 65 $\mu$A. The output of the respective electron beam tube becomes greater, the greater distant it is from the center electron beam tube a.

In other words, in the vicinity of the center electron beam tube b, there are several electron beam tubes. The substance to be treated, which is located directly underneath this electron beam tube a, is irradiated with some of the electron beams from the electron beam tubes b, the electron beam tubes c and the electron beam tubes d in their vicinity, for which reason the output of the electron beam tube is reduced. In contrast, in the vicinities of the electron beam tubes d located at the outermost points, there are, in part, other electron beam tubes, while some of the other electron beam tubes no longer act on this area. As shown in FIG. 4, in the area of the outermost electron beam tubes d, there are electron beam tubes b and c, while outside the outermost electron beam tubes d, there are no other electron beam tubes. The number of electron beams on the substance to be treated which is located directly underneath electron beam tubes d is therefore smaller than directly underneath the electron beam tube a, and thus the output of electron beam tubes d is increased.

In this embodiment, under the condition that all distances between the electron beam tubes are the same, the electron beam radiation dose emitted by the respective electron beam tube is fixed such that the absorption dose of the entire treatment area of the substance to be treated becomes uniform. Therefore, the output of the electron beam tube a is 45 $\mu$A, the output of the electron beam tubes b is 50 $\mu$A, the output of the electron beam tubes c is 60 $\mu$A, and the output of the electron beam tubes d is 65 $\mu$A. As a result, the absorption dose of the entire treatment area on the substance W can be made uniform and the substance W can be treated overall in a uniform manner without moving.

Furthermore, there are also cases in which, depending on the pressure state within the processing chamber 2 or the distances between the substance W and the electron beam windows 15 of the electron beam tubes 1, the radiation doses of the respective electron beam tubes 1 are completely identical to one another.

One such arrangement for electron beam tubes is suited for a circular treatment area of the substance to be treated.

The dose of the electron beams emitted by the respective electron beam tube is in furthermore established with consideration of the doses of the electron beams emitted by the other electron beam tubes in the vicinity, the distances from the other electron beam tubes in the vicinity, the number of electron beam tubes and/or the distance from the inside wall of the processing chamber, such that the absorbed dose of the entire treatment area of the substance to be treated reaches a given, or predetermined, distribution.

Figure 5:
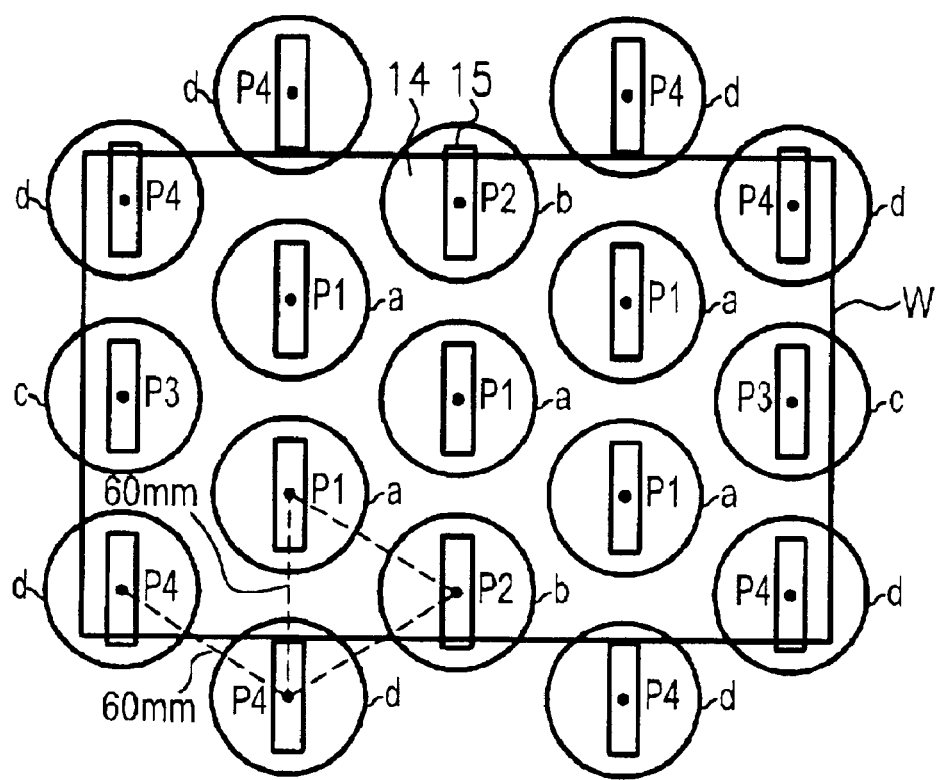
FIG. 5 is a schematic of the arrangement of other electron beam tubes of the electron beam treatment device the present invention.

FIG. 5 shows a schematic in which, as in FIG. 4, cover component 14 and electron beam window 15 of electron beam tube 1 are shown, and in which also the substance W (although rectangular in this embodiment) is shown at the same time so that the relation between the arrangement of the electron beam tubes and the rectangular substance to be treated can be seen. In FIG. 5, around center point P1 of electron beam window 15 of electron beam tube 1 which is located essentially above the center point of the workpiece or substance surface to be irradiated, six other electron beam tubes (b, c, d) are arranged such that they surround the electron beam tube a and such that they are adjacent to one another with a spacing of 60°. Furthermore, around center point P2 of electron beam window 15 of electron beam tube b, there are five more electron beam tubes (a, d) arranged such that they surround electron beam tube b and such that they are adjacent to one another with a spacing of 60°. Furthermore, around center point P3 of electron beam window 15 of electron beam tube c, there are four more electron beam tubes (a, d) arranged such that they surround the electron beam tube c and such that they are adjacent to one another with a spacing of 60°. Furthermore, around center point P4 of electron beam window 15 of electron beam tube d, there are three more electron beam tubes (a, b, c, d) arranged such that they surround electron beam tube d and such that they are adjacent to one another with a spacing of 60° (although this arrangement differs depending on the point at which the electron beam tube d is located). There is an arrangement in which all distances between the center points P1, P2, P3 and P4 of the adjacent electron beam windows 15 are 60 mm. Overall, an arrangement is formed in which several parallel rows of electron beam tubes run parallel to the outside edges of the rectangular workpiece. Adjacent rows of electron beam tubes are set in a staggered manner to one another. The outermost rows which run parallel to the lengthwise sides of the workpiece are located outside the workpiece area while all other electron beam tubes are located within the workpiece area. In this embodiment, the output of the electron beam tubes a is 50 $\mu$A, the output of the electron beam tubes b is 55 $\mu$A, the output of the electron beam tubes c is 60 $\mu$A, and the output of the electron beam tubes d is 65 $\mu$A.

In a particular electron beam tube, the output is set considering the doses of the electron beams emitted by the other adjacent electron beam tubes in the vicinity of the particular electron beam tube and the distance from the other electron beam tubes. Specifically, in the vicinity of the electron beam tubes a, there are six electron beam tubes at a time. Thus, some of the electron beams from the electron beam tubes in the vicinity are emitted onto the substance to be treated which is located directly underneath the electron beam tubes a, and thus the output of electron beam tubes a is reduced. In the vicinity of electron beam tubes d, there are only three adjacent electron beam tubes. The number of electron beams on the substance to be treated, which is located directly underneath electron beam tubes d, is therefore smaller than directly underneath the electron beam tubes a, and thus the output of electron beam tubes d is increased.

In this embodiment, under the condition that all distances between the electron beam tubes are the same, the electron beam radiation dose emitted by the respective electron beam tube is fixed such that the absorption dose of the entire treatment area of the substance becomes uniform. The output of the electron beam tubes a is 50 $\mu$A, the output of the electron beam tubes b is 55 $\mu$A, the output of the electron beam tubes c is 60 $\mu$A, and the output of the electron beam tubes d is 65 $\mu$A. As a result, the absorption dose of the entire treatment area on substance W can be made uniform and substance W can be treated overall in a uniform manner without moving.

Furthermore, there are also cases in which, depending on the pressure state within processing chamber 2 or the distances between substance W and electron beam windows 15 of electron beam tubes 1, the radiation doses of the respective electron beam tubes 1 are completely identical to one another.

One such arrangement of the electron beam tubes is suited for a rectangular treatment area of the substance to be treated.

The dose of the electron beams emitted by the respective electron beam tube is furthermore established with consideration of the doses of the electron beams emitted by the other electron beam tubes in the vicinity, the distances from the other electron beam tubes in the vicinity, the number of electron beam tubes and/or the distance from the inside wall of the processing chamber such that the absorption dose of the entire treatment area of the substance to be treated has a given distribution.

Using the electron beam treatment device of the present invention as shown in FIG. 3, the treatment technique with electrons is described below. The arrangement of the electron beam tubes of this device is identical to the arrangement of the electron beam tubes shown in FIG. 4. The interior of processing chamber 2 was evacuated to a sufficient degree by outlet system 4. Afterwards, nitrogen gas was admitted into processing chamber 2 by gas inlet system 5 so that the internal pressure was 5 torr. The distance between electron beam window 15 of the respective electron beam tube 1 as shown in FIG. 3 and substance W on stage 3 (which is a silicon wafer) was set to 60 mm. The distance between the respective electron beam tubes is 60 mm, as shown in FIG. 4. The electron beam tubes a, b, c, and d all have an acceleration voltage of 25 kV and an output of 50 $\mu$A. For all electron beam tubes a, b, c, and d, the electron beam window 15 consists of silicon with a thickness of 3 microns.

A circular EB-sensitive film, 20 microns thick with a diameter of 200 mm, was placed on substance W as an electron beam dose measurement film. Electron beams were emitted for 70 seconds from all electron beam tubes in the direction of the EB-sensitive film. The absorption dose on the EB-sensitive film was 14 $\mu$C/cm$^2$. Due to the degree of sensitivity of the EB-sensitive film, the maximum value of the absorption dose and the minimum value of the absorption dose of the entire treatment area were subjected to a real measurement. Using the following evaluation formula, the amplitude degree of the absorption dose of the entire treatment area was assessed.

Amplitude degree=(maximum value of the electron beam dose−minimum value of the electron beam dose)/(maximum value of the electron beam dose+minimum value of the electron beam dose)×100%.

Using this amplitude degree, the uniformity was evaluated. Uniformity according to the following formula becomes higher, the closer the amplitude degree approaches 0. The amplitude degree which shows uniformity is 7%. This shows that the substance to be treated is irradiated essentially uniformly with electron beams.

On the other hand, in the case in which, in the above described electron beam treatment device, only the pressure in the processing chamber 2 was set to atmospheric pressure, the electron beams reached only up to 6 mm in front of electron beam windows 15, and the electrons did not reach substance W which is 60 mm away from electron beam windows 15. Thus, in this case, the substance to be treated could not be treated.

Therefore, since the interior of processing chamber 2 is shifted into a nitrogen low pressure state of 5 torr, the distance between electron beam windows 15 of the respective electron beam tubes 1 and substance W was set to 60 mm, and the arrangement and the output of the respective electron beam tube are fixed in the above described manner, the absorption dose of the entire treatment area on substance W is made uniform, by which the substance W to be treated can be uniformly treated as a whole.

Another embodiment of treatment with electrons using the electron beam treatment device of the present invention as shown in FIG. 3 is described below. The electron beam tubes of this device are arranged as follows. The distance between the respective electron beam tubes is 60 mm, as shown in FIG. 4. The electron beam tubes a, b, c, and d all have an acceleration voltage of 25 kV and an output of 50 $\mu$A. For all electron beam tubes a, b, c, and d, electron beam window 15 consists of silicon 3 microns thick. The interior of processing chamber 2 was evacuated to a sufficient degree by outlet system 4. Afterwards, nitrogen gas was admitted into processing chamber 2 by gas inlet system 5 so that the internal pressure was 5 torr. The distance between electron beams-windows. 15 of the respective electron beam tubes 1 and stage 3, as shown in FIG. 3 was set in two ways. That is, the distance of the substance W to be treated which is a silicon wafer was set to 60 mm and 75 mm.

A circular EB-sensitive film, 20 microns thick with a diameter of 200 mm, was cemented on the substance W as an electron beam dose measurement film. Electron beams were emitted for 25 seconds from all electron beam tubes in the direction of the EB-sensitive film. The absorption dose on the EB-sensitive film was 26 $\mu$C/cm$^2$ in the case in which the distance between electron beam windows 15 and substance W was 60 mm. It was 20 $\mu$C/cm$^2$ on the EB-sensitive film in the case in which the distance between electron beam windows 15 and substance W was 75 mm.

The degree of sensitivity of the EB-sensitive film was measured using the above described measurement process, by which the amplitude degree of the electron beams on the substance to be treated was measured. This resulted in an amplitude degree, which shows uniformity, of 10% in the case in which the distance between the electron beam windows and the substance to be treated was 60 mm. Furthermore, the amplitude degree was 6.5% in the case in which the distance between the electron beam windows and the substance to be treated was 75 mm. This shows that, at a high acceleration voltage of 40 kV, the broadening of the electron beams emitted from the electron beam windows is low and that the superposition of the electron beams emitted from the other electron beam tubes is inadequate when the electron beam window and the substance to be treated have approached very near one another, i.e. when the distance between the two is 60 mm. In this case, the absorption dose of the entire treatment area on the substance to be treated becomes nonuniform. Furthermore, it becomes apparent that, in the case in which the distance between the electron beam windows and the substance to be treated was 75 mm, the superposition of the electron beams emitted by the other electron beam tubes reaches an optimum state and that the absorption dose of the entire area on the substance to be treated becomes uniform.

As a result, it is recognized that, depending on the irradiation conditions of the electron beams, such as the pressure in the processing chamber, the magnitude of the acceleration voltage and the like, the uniformity of the absorption dose of the entire treatment area on the substance W can be increased by changing the distance between the electron beam windows of the electron beam tubes and the substance W.

Furthermore, in the case in which the uniformity has a certain tolerance, when treating the substance with electron beams, the depth of the electron beams penetrating the substance can be adjusted by changing the distance between the electron beam windows of the electron beam tubes and the substance to be treated. Specifically, in the process of curing a SOG film, the distance between the electron beam windows and the substance to be treated is first kept constant to cure the liquid material for the SOG film which has been applied to a silicon wafer. Only after the surface of the liquid material for the SOG film has been cured, can the distance between the electron beam windows and the substance to be treated be shortened so that the electron beams reach deep into the interior of the liquid material for the SOG film, thereby curing the interior.

Another embodiment of electron beam treatment using the electron beam treatment device of the present invention as shown in FIG. 3 is described below. The electron beam tubes of this device are arranged as follows. The distance between the respective electron beam tubes is 60 mm, as shown in FIG. 4. The output of the electron beam tubes a is 45 $\mu$A, the output of the electron beam tubes b is 50 $\mu$A, the output of the electron beam tubes c is 60 $\mu$A, and the output of the electron beam tubes d is 65 $\mu$A. Electron beam tubes a, b, c, and d all have an acceleration voltage of 25 kV. All electron beam windows 15 consist of silicon having a thickness of 3 microns. The interior of processing chamber 2 was evacuated to a sufficient degree by outlet system 4. Afterwards, nitrogen gas was admitted into processing chamber 2 by gas inlet system 5 so that the internal pressure was 5 torr. The distance between electron beam window 15 of the respective electron beam tube 1 and substance W to be treated on stage 3 (which was a silicon wafer) was set to 60 mm.

The degree of sensitivity of the EB-sensitive film was measured using the above described measurement process, by which the amplitude degree of the absorption dose of the entire treatment area was measured. This resulted in the amplitude degree, which shows uniformity, being 5.5% and the electron beams in the processing chamber being superimposed in an extremely advantageous manner, by which the absorption dose of the entire treatment area on substance W becomes extremely uniform and the substance W can be treated by the electron beams in a uniform manner. This means that the electron beams are superimposed in an extremely advantageous manner in the processing chamber by the fact that the distance between the respective electron beam tubes is kept constant, the respective electron beam tubes are arranged such that, around the electron beam tubes a, the electron beam tubes b are arranged concentrically, outside of which the electron beam tubes c are located, outside of which in turn the electron beam tubes d are located, and that the output value of the electron beam tubes is increased more, the farther to the outside the electron beam tube is located so that the absorption dose of the entire treatment area on the substance to be treated becomes extremely uniform, as shown in FIG. 4. This shows that substance W can be uniformly treated by the electron beams using this set-up.

The tolerance of the amplitude degree of the absorption dose of the entire treatment area of the substance to be treated changes depending on the type of substance to be treated and the treatment process. By reducing the distance between electron beam windows 15 and substance W on stage 3, to prevent the tolerance of this amplitude degree from being exceeded, the maximum irradiation rate and thus optimum irradiation conditions can be obtained. In the case in which the substance to be treated is small, several objects to be treated can also be placed on stage 3 and treated overall.

As described above, the absorption dose of the entire treatment area of the substance to be treated by the electron beam treatment device of the present invention is made uniform by the dose of the electron beam emitted by the respective electron beam tube being assigned with consideration of the doses of the electron beams emitted by the other electron beam tubes in the vicinity and with consideration of the distance from the other electron beam tubes in the vicinity, such that the absorption dose of the entire treatment area of the substance to be treated is shifted into a given distribution condition, when the given distribution condition is a uniform condition. In this way, the entire treatment area of the substance to be treated can be uniformly treated as a whole without moving the substance to be treated.

Furthermore, by subjecting the processing chamber to a low pressure by the pressure control system, the electron beams emitted by several electron beam tubes can be optimally superimposed and thus all the electron beams can be made more uniform. In addition, the depth of the electron beams penetrating the substance to be treated, and the uniformity of the electron beams, can be adjusted to the substance to be treated by changing the distance between the electron beam windows of the electron beam tubes and the substance W.

I claim:

1. An electron beam treatment device for treating a circular substance located in a processing, chamber with electron beams which are produced by electron beam generating devices, comprising
   a plurality of electron beam tubes, each of said plurality of electron beam tubes including a vacuum container and a front side,
   an electron beam window positioned on the front side of each of said plurality of electron beam tubes for projecting into the processing chamber and transmitting electron beams, and
   means for holding said circular substance directly under the windows of said plurality of electron beam tubes,
   wherein said plurality of electron beam tubes are located in several concentric rings around a center, located essentially over a center point of the substance, wherein the plurality of electron beam tubes are grouped according to their distance from the center point, wherein all electron beam tubes in a grouping have substantially the same output and wherein an output control is provided for controlling the output of each grouping of electron beam tubes so as to provide a uniform treatment of the entire surface of said circular substance without moving the substance in a direction transverse to the vertical axes of the electron beam tubes.

2. The electron beam treatment device of claim 1, further including a pressure control system for applying a low pressure to the processing chamber.

3. The electron beam treatment device of claim 1, further including a stage positioned in the processing chamber for accommodating the substance to be treated, the stage being movable for changing a distance between said stage and the electron beam windows in directions axially toward and away from said electron beam windows.

4. The electron beam treatment device of claim 1, wherein the output of a particular electron beam tube has been set depending on at least one of: the number of electron beam tubes adjacent to the particular electron beam tube, the output of adjacent electron beam tubes, the spacing of adjacent electron beam tubes, distance of the particular electron beam tube from the substance, and pressure in the processing chamber.

5. An electron beam treatment device for treating a rectangular substance located in a processing, chamber with electron beams which are produced by electron beam generating devices, comprising
   a plurality of electron beam tubes, each of said plurality of electron beam tubes including a vacuum container and a front side,
   an electron beam window positioned on the front side of each of said plurality of electron beam tubes for projecting into the processing chamber and transmitting electron beams, and
   means for holding said rectangular substance directly under the windows of said plurality of electron beam tubes,
   wherein said plurality of electron beam tubes are arranged in groups of electron beam tubes over the substance, wherein electron beam tubes belonging to the same group have substantially the same output and are physically surrounded by an identical number of neighboring electron beam tubes, and wherein a control is provided for controlling the output of each group of electron beam tubes so as to provide a uniform treatment of the entire surface of said rectangular substance without moving the substance in a direction transverse to the vertical axes of the electron beam tubes.

6. The electron beam treatment device of claim 5, further including a pressure control system for applying a low pressure to the processing chamber.

7. The electron beam treatment device of claim 5, further including a stage positioned in the processing chamber for accommodating the substance to be treated, the stage being movable for changing a distance between said stage and the electron beam window in directions axially toward and away from said electron beam windows.

8. The electron beam treatment device of claim 5, wherein the output of a particular electron beam tube has been set depending on at least one of: the number of electron beam tubes adjacent to the particular electron beam tube, output of adjacent electron beam tubes, spacing of adjacent electron beam tubes, distance of the particular electron beam tube from the substance, and pressure in the processing chamber.

* * * * *